United States Patent
Rusinko, Jr. et al.

(10) Patent No.: US 7,319,079 B2
(45) Date of Patent: Jan. 15, 2008

(54) CONTAINER FOR EVAPORATION OF METAL AND METHOD TO MANUFACTURE THEREOF

(76) Inventors: David Michael Rusinko, Jr., 7032 Brandywine Rd., Parma Heights, OH (US) 44130; Ajit Sane, 3535 Trails End Dr., Medina, OH (US) 44256

( * ) Notice: Subject to any disclaimer, the term of this patent is extended or adjusted under 35 U.S.C. 154(b) by 106 days.

(21) Appl. No.: 10/949,785

(22) Filed: Sep. 24, 2004

(65) Prior Publication Data

US 2005/0065015 A1    Mar. 24, 2005

Related U.S. Application Data

(60) Provisional application No. 60/505,587, filed on Sep. 24, 2003.

(51) Int. Cl.
*C04B 35/5835* (2006.01)
*C04B 35/58* (2006.01)

(52) U.S. Cl. .................... 501/96.3; 501/96.4
(58) Field of Classification Search ............. 501/96.3, 501/96.4; 252/520.2, 520.22
See application file for complete search history.

(56) References Cited

U.S. PATENT DOCUMENTS 4,528,120 A     7/1985  Hunold et al.
4,847,031 A  *  7/1989  Parent et al. ............... 264/332
5,604,164 A  *  2/1997  Montgomery et al. ...... 501/96.1
6,466,738 B2 * 10/2002  Jungling ..................... 392/388

FOREIGN PATENT DOCUMENTS

| EP | 0429345 | 5/1991 |
| GB | 978734 | 12/1964 |
| JP | 62-139866 | 6/1987 |
| JP | 03-013566 | 1/1991 |
| JP | 05-001368 | 1/1993 |
| JP | 06-298566 | 10/1994 |
| JP | 06298566 | 10/1994 |
| JP | 07-315965 | 12/1995 |

OTHER PUBLICATIONS

Machine translation of Japanese document 06-298566, Oct. 25, 1994.*
XP002327970, May 27, 1988, Japan abstract.
Esk Engineered Ceramincs—Wacker Chemicals article, "The Effects of Boat and Wire Parameters on Boat Life and Coating Quality in Vacuum Metallization of an OPP Web", E.Josephson, et al.

* cited by examiner

*Primary Examiner*—Karl Group
(74) *Attorney, Agent, or Firm*—Dominick G. Vicari

(57) ABSTRACT

A refractory container for evaporating metals, having significantly improved useful life and corrosion resistance properties, said container consists essentially of a refractory boride, boron nitride, and about 0.10 to 10 wt. % of a rare earth metal compound selected from one of an oxide, a nitride, a carbide, or mixtures thereof.

1 Claim, No Drawings

CONTAINER FOR EVAPORATION OF METAL AND METHOD TO MANUFACTURE THEREOF

CROSS-REFERENCE TO RELATED APPLICATIONS

This application claims priority to U.S. Provisional Application Ser. No. 60/505587 filed on Sep. 24, 2003, which is incorporated herein by reference in its entirety.

FIELD OF THE INVENTION

The present invention relates to an improved container for the vacuum evaporation of metal.

BACKGROUND OF THE INVENTION

Vacuum deposition is a common method for coating metals such as aluminum, copper, zinc, and tin onto various substrates of metal, glass, and plastic. The metal is typically vaporized by means of electric resistance heating in a metallic or ceramic container or vessel generally referred to in the art as a "boat" or a metallization boat. The boat is connected to a source of electrical power within an evacuated chamber and heated to a controlled operating temperature sufficient to cause a metal charge placed in contact with the boat to vaporize.

In the vacuum metallization process, the metal melt in a metallization boat is heated to a very high temperature, in many instances to a temperature higher than typically seen in casting operations, of up to 1200° C. and above. This means that the metal melt, i.e., aluminum melt, will be much more aggressive and behave as a corrosive acid, lowering the life of the metallization boats.

Besides the metallization conditions, a factor in the life of the boat is the wettability of the boat surface. If the surface of the boat is not substantially wettable to molten metal, higher boat temperatures will be required to evaporate a unit amount of aluminum due to smaller evaporation surface area. Higher operating temperature will consequently lead to a higher corrosion rate thus reducing the useful life of the boat.

Besides the wettability of the boat surface, another factor that is important to longer/useful boat life is the wettability of the slag build-up in the cavity of the boat. After a few hours of metallizing operations, a slag begins to build up around the edge of the metal puddle in the boat. The slag is the by-product of the reaction of the molten metal with the refractory boat. The slag is typically non-wetting to the metallizing metal and inhibits the spreading of the metal puddle, thus increases the operating temperature and further reduces the useful life of the boat. Improved wetting of the boat and/or slag surface is believed to be an important factor in increasing the average life of metallization boats.

There is yet another property/factor that is important to longer and useful boat life; it is the resistance to thermal degradation of the boat. If the boat operating temperature exceeds a critical value, e.g., in excess of 1600° C., the boat will thermally decompose, allowing the molten metal to penetrate into the boat thus decreasing the useful life of the boat. This phenomenon is typical when the wire is not fed uniformly onto the boat surface, causing the development of localized hot spots within the boat.

The average life of metallization boats in the prior art ranges is about ten (10) hours, providing from about 600,000 metallized feet of substrate to about 1,000,000 feet of substrate, depending on the metallizing conditions. There is a continuous interest in increasing the useful life of metallization boats with various refractory boat compositions. U.S. Pat. No. 4,528,120 discloses boats comprising 10–60 wt. % boron nitride ("BN"), 0–60% of at least one of an aluminum nitride and a silicon nitride, and 30–70 wt. % of one of the group of the borides of titanium, zirconium, aluminum, and chromium and the carbides of silicon, titanium and chromium. JP Publication Number 06-298566 discloses a composition comprising 0.3 to 10 wt. % of an alkaline earth metal oxide, rare earth oxide, or alkaline-earth-metal borate, 15–50 wt. % BN, and the remainder aluminum nitride and titanium diboride in a ratio of 1:1.5 to 1:4.

In U.S. Pat. No. 5,604,164 to Montgomery, it is disclosed that "the addition of an elemental metal such as molybdenum and an oxide additive such as $Y_2O_3$ to a ceramic composite composition of titanium diboride and boron nitride, has been found to substantially improve the properties of the boat, especially its wetting characteristics, and a reduction in the rate of corrosion of the boat cavity by aluminum." Montgomery discloses a refractory boat consisting essentially of titanium diboride; boron nitride; at least 3 wt. % of a metal selected from Mo, W, Ta, and Nb; and at least 0.7 wt. % of an oxide selected from CaO and $Y_2O_3$.

There is still a need to increase useful life of metallization boats. Applicants have surprisingly found that a refractory boat composition with improved properties, including improved resistance to thermal degradation, wettability, and corrosion resistance provides longer useful life. The surprising improved composition for refractory boats in one embodiment exhibit properties of: a) less corrosion of the boat surface; b) a higher degree of thermal degradation resistance, c) more wettable boat surface; and d) more wettable slag, without the requirement of doping the composition with at least 3 wt. % of the metal element Mo, Ta, W, and/or Nb.

BRIEF SUMMARY OF THE INVENTION

A refractory container for evaporating metals, which consists essentially of a refractory boride, boron nitride, and about 0.10 to 10 wt. % of a rare earth metal compound selected from one of an oxide, a carbide, a nitride or mixtures thereof. In one embodiment of the invention, the rare earth metal compound consists essentially of yttrium oxide.

The invention also relates to a process for the manufacture of a refractory container for evaporating metals, the process comprises the steps of: a) forming a homogenous mixture of powders of a composition consisting essentially of a refractory boride, boron nitride, and about 0.10 to 10 wt. % of a rare earth metal compound selected from one of an oxide, a nitride, a carbide, or mixtures thereof; b) forming a green body having a density of at least 50% of the theoretical density of the powder mixture; d) heating the green body at a sufficiently high temperature and pressure to form a densified billet of at least about 85% of theoretical density; and e) cooling and recovering the billet.

DETAILED DESCRIPTION OF THE INVENTION

As used herein, the expression "consisting essentially of" permits the inclusion of substances, which do not materially affect the basic and novel characteristics of the refractory composition under consideration.

Composition of the Refractory Boat of the Invention. In one embodiment of the invention, the refractory composition consists essentially of a refractory boride, boron nitride, and about 0.10 to 10 wt. % of a rare earth metal compound selected from one of an oxide, a nitride, a carbide or mixtures there of.

Examples of rare earth metals include but are not limited to yttrium, lanthanum, cerium, praseodymium, neodymium, samarium, europium, gadolinium, terbium, dysprosium, holmium, erbium, thulium, ytterbium, and lutetium. Examples of rare earth metal oxides include but are not limited to yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, and lutetium oxide.

Examples of refractory borides include but are not limited to borides of refractory hard metals like Ta, Zr and transition metals like Ti such as titanium diboride, zirconium diboride, or mixtures thereof.

In one embodiment of the invention, the refractory composition consists essentially of about 35 to 65 wt. % a refractory boride, 45 to 65 wt. % boron nitride, and about 0.10 to 10 wt. % of the rare earth metal compound comprising a rare earth metal oxide. In one example, the amount of the rare earth metal compound comprising a rare earth metal oxide is in the range of 0.10 to 7 wt. % of the composition.

In a second embodiment of the invention, the composition further includes less than about 10 wt. % aluminum nitride or silicon nitride powders, having an average particle size of about 15 microns or less. In one example, the amount of aluminum nitride or silicone nitride is less than 5%. In yet another example, it is less than 3%.

In a third embodiment of the invention, the composition further comprises calcium oxide or aluminum oxide, and or compounds of these oxides and rare earth oxides, for a total concentration of oxide of less than 10 wt. %.

In a fourth embodiment of the invention, the composition further includes between 0.2 to 5 wt % of elements or compounds selected from the groups consisting of carbides and nitrides of the elements Al, Si, Ti, Fe, Co, Ni and mixtures thereof.

In a fifth embodiment of the invention, instead of a rare earth metal oxide or in addition to a rare earth metal oxide, a rare earth metal nitride, e.g., a yttrium nitride, is included in the starting composition such that the nitride is converted partially or completely to an oxide in the hot pressing process for a refractory boat comprising a rare earth metal oxide.

In a sixth embodiment of the invention, instead of a rare earth metal oxide or in addition to a rare earth metal oxide in the starting composition, a rare earth metal carbide, e.g., lanthanum carbide, is included in the starting composition for conversion partially or completely to a rare earth metal oxide or oxide compounds in the hot pressing process.

In yet another embodiment of the invention, the boron nitride powder component has a specific surface area from about 2 to 40 m$^2$/g (measured by the BET method known in the art) and a purity of at least 96% by weight. By 96% purity, it is meant that the total of boron and nitrogen found by analysis is at least 96% by weight; oxygen in the form of adherent boric oxide and boron oxynitrides, can be present in an amount of up to 3.8% by weight; and a total of up to about 0.1 wt. % of carbon and 0.5 wt. % of metal impurities can be present in the composition.

The titanium diboride powder component in one embodiment is substantially free of undesirable metal contaminants, i.e., the powders are essentially pure, as established by emission spectrographic analysis. Metal impurities (as elemental metal) if present, are normally less than 5,000 parts per million parts of the boride powder (ppm), i.e., less than 0.5 weight percent of the total weight of the $TiB_2$, including but not limited to aluminum, barium, calcium, chromium, cobalt, copper, iron, potassium, lithium, magnesium, manganese, sodium, nickel, silicon, vanadium, tungsten, and zinc. The source of such metal impurities, if present, in the boride powder product is normally the reactants or equipment used to prepare the product. Impurities up to 1% by weight selected from the groups consisting of oxides, carbides, and nitrides of the elements titanium and boron may also be present.

In one embodiment of the invention, the rare earth metal compound is yttrium oxide or lanthanum oxide. In the example, Applicants have surprisingly found that yttrium compounds consisting mostly of yttrium oxide $Y_2O_3$ improve the wetting properties of the refractory boat and the slag formed therein, for a metallization boat with substantially improved useful life.

In one embodiment, wherein the rare earth metal oxide is yttrium oxide, the yttria or yttrium oxide component is of at least 95% purity and has an average particle size of about 15 microns or less.

In yet another embodiment, optional oxides including CaO, MgO, $Al_2O_3$, $TiO_2$, compounds of these oxides and rare earth oxides may be used in combination with the rare earth metal oxides, e.g., $Y_2O_3$ at a level of about 0.10 to 10 wt. % total. Examples of compounds of rare earth oxides include YAG ($Al_5Y_3O_{12}$), YAP ($AlYO_3$) and YAM ($Al_2Y_4O_7$).

In one embodiment, the total amount of the optional metal oxides is about 0.75 to 5 wt. %. In another embodiment, the amount is from about 1 to 3 wt. %.

Method of Manufacturing the Metallizing Boat. In one embodiment, a powder mixture of BN, $TiB_2$, a rare earth Metal oxide powder and optionally AlN and/or CaO, $Al_2O_3$, and $TiO_2$ is prepared by utilizing a mixing means to provide a homogeneous mixture, e.g., by high-shear blending, ball milling, attritor milling, jet milling, etc. Mixing can be accomplished under wet or dry conditions, for example, in air or under inert gas such as argon or nitrogen or in water or organic solvents such as acetone, methanol, or isopropanol. The mixture powder is then molded to obtain a green compact by a molding means such as a dry press molding, cold isostatic press (CIP) molding, injection molding, etc.

Subsequently, the green compact is sintered to a theoretical density of at least 85% in the non-oxidation atmosphere such as vacuum or an inert gas atmosphere e.g., nitrogen and argon, or a reducing gas atmosphere, e.g., hydrogen, by utilizing a sintering means such as an atmospheric pressure sintering, vacuum sintering, gas pressure sintering, hot press sintering, or a hot isostatic pressing (HIP) sintering. The non-oxidation atmosphere is for preventing oxidation of the non-oxide ceramic powder. The HIP sintering usually comprises the steps of sealing the green compact into a metal or glass capsule, and then keeping the capsule under a hot isostatic pressure. In one example, the densification temperature is in the range of about 1300 to 2100° C., and the applied pressure is in the range of about 5 to 300 MPa.

From the sintering process, a densified billet with density of at least about 85 to 98% of the theoretical density (TD) of the material is obtained. The density depends on the pressure, the temperature, and the dwell time used in the process. The evaporation boat can be machined out of the densified billet in any desired direction.

EXAMPLES

Examples are provided herein to illustrate the invention but are not intended to limit the scope of the invention.

Examples 1–5

In examples 1–5, the powders having the following analyses are used as the starting materials, with $Y_2O_3$ as the rare earth metal oxide Example 5 comprises the grade Mo-21P of the Montgomery reference, hence, the "Montgomery" example.

TABLE 1

| | | Composition (wt. %) | | | | |
|---|---|---|---|---|---|---|
| Example | % TD | BN | $TiB_2$ | CaO | $Y_2O_3$ | $Al_2O_3$ | Mo |
| 1 | 90% | 53.9 | 45.0 | 1.1 | — | — | — |
| 2 | 87% | 52.3 | 46.4 | 0.32 | 0.37 | 0.56 | — |
| 3 | 85% | 52.0 | 46.4 | 0.16 | 1.09 | 0.29 | — |
| 4 | 84% | 52.1 | 46.4 | 0.13 | 0.68 | 0.64 | — |
| 5 | 86% | 44.6 | 44.6 | — | 5.41 | — | 5.42 |

In each example, powder mixture comprising the components is homogenized dry in a high-shear blender. The powder mixture is then cold pressed to form a cylindrical green body having a diameter of 2 inches a height of 2 to 5 inches. The green body is introduced into a hot press and densified at 1450° C. to 2000° C. in a reducing atmosphere under an argon gas purge.

Evaporation boats approximately 100 mm by 20 mm by 6 mm are cut from the block and provided with a depression or cavity measuring approximately 60 mm by 15 mm by 2 mm. Irrespective of their position in the block, the evaporation boats made from compositions of examples 1–51 have a density of 84% to 90% theoretical density (TD) with specific resistance of 400 to 1200 μohm×cm.

Tests on the Evaporation Boats 1–5: The evaporation boats made from examples 1–5 are tested under the following conditions for the vacuum evaporation of aluminum. The boats are heated by the direct passage of current in a vacuum chamber. The aluminum is supplied continuously via an aluminum wire feed near one end of the cavity and a hot spot is induced at the far end of the boat. The maximum temperature of the hot spot ranges from about 1715 to 1781° C.

As the test progresses, it is noted that aluminum soaks completely through the boat of Example 5 (the "Montgomery" boat) forming a crack down the center of the boat. Examples 1–4 have significantly less aluminum soak through. After 30 minutes, it is observed that the Montgomery boat has thermally degraded to the point where cracks are visible, as opposed to the boats of the present invention (without metal doping) that are still usable.

Examples 6–10

Examples 1–5 are repeated, except that lanthanum oxide powder with purity of about 95 to 99% is used instead. The results of the experiments are similar to the results obtained in examples 1–5, with the examples of the present invention having minimal or significantly less aluminum soak through compared to the Montgomery example of the prior art.

Examples 11–19

In the examples, billets comprising compositions listed in Table 2 are formed, then measured for electrical conductivity as well as being subject to wettability tests. All components in Table 2 are in wt. %.

The billets are formed by homogenizing dry a powdered mixture of the components in a high-shear blender. The blended powder is then cold pressed to form a cylindrical green body having a diameter or 2 inches and a height of 4 to 6 inches. The green body is introduced into a hot press and densified at 1450 to 2100° C. in a reducing atmosphere under an argon gas purge forming billets. With respect to Example 15, in order to ensure the $ZrO_2$ powder to be less than 0.7 um, a pre-blended powder containing $ZrO_2$ is wet ball-milled and dried prior to homogenization with the other components.

In the wettability test, the wettability of the billet samples to molten aluminum is measured by placing an aluminum ingot of known mass onto the surface of a polished sample. The sample and the aluminum are then quickly heated under a vacuum of less than 0.001 millibar until the aluminum melts, spreads, and then evaporates. After evaporation, the area to which the aluminum spreads is visible and can be measured using digital image analysis. Wettability values can be obtained by dividing the spreading area of the aluminum by the mass of the aluminum ingot, in units of $mm^2$/gram.

TABLE 2

| Example | BN | TiB2 | CaO | Y2O3 | Al2O3 | ZrO2 | AlN | Mo |
|---|---|---|---|---|---|---|---|---|
| 11 | 52.3 | 44.3 | 0.1 | 0.7 | 0.6 | | 2.0 | |
| 12 | 54.0 | 44.3 | | 1.7 | | | | |
| 13 | 45.9 | 44.4 | | 1.7 | | | | 8.0 |
| 14 | 54.3 | 44.3 | | 0.8 | 0.7 | | | |
| 15 | 52.9 | 44.3 | | | | 2.8 | | |
| 16 | 39.3 | 44.3 | 0.1 | 0.7 | 0.6 | | 15.0 | |
| 17 | 54.3 | 44.3 | | 0.8 | 0.7 | | | |
| 18 | 54.3 | 44.3 | 0.1 | 0.7 | 0.6 | | | |
| 19 | 54.6 | 44.3 | 1.1 | | | | | |

The results of the tests on the billets to measure their wettability property, density, and resistivity are presented in Table 3:

TABLE 3

| Example | Theo. Density (g/cc) | Wetting Area ($mm^2$/g) | mass (g) | Density (g/cc) | % Theoretical Density | resistivity (u-ohm-cm) |
|---|---|---|---|---|---|---|
| 11 | 2.98 | 4770 | 22.3 | 2.2 | 75% | 2986 |
| 12 | 2.97 | 5758 | 23.9 | 2.4 | 81% | 19028 |
| 13 | 3.23 | 5007 | 21.1 | 2.7 | 83% | 6395 |
| 14 | 2.96 | 5165 | 21.4 | 2.5 | 84% | 2059 |

TABLE 3-continued

| Example | Theo. Density (g/cc) | Wetting Area (mm²/g) | mass (g) | Density (g/cc) | % Theoretical Density | resistivity (u-ohm-cm) |
|---|---|---|---|---|---|---|
| 15 | 2.99 | 4989 | 21.8 | 2.5 | 84% | 4436 |
| 16 | 3.14 | 5616 | 21.0 | 2.7 | 86% | 959 |
| 17 | 2.96 | 4973 | 22.3 | 2.6 | 87% | 4228 |
| 18 | 2.96 | 3482 | 22.1 | 2.6 | 88% | 1994 |
| 19 | 2.94 | 854 | 21.9 | 2.7 | 92% | 3966 |

Examples 20–22

In these examples, metallization boats are formed and tested in forming metallized films. The boats comprising the composition of the invention are compared to metal boats commercially available on the market, i.e., "Classic" boats from GE Advanced Ceramics of Cleveland, Ohio. Example 20 employs the Classic boat composition, known to be a "2-part boat," or a composition containing TiB2 and BN as the major constituents. Example 21 represents a "3-part boat" composition, commercially available from GE Advanced Ceramics as "AC-6000." Three-part composition is typically defined as a composition containing TiB2, BN, and AlN as the major constituents. Example 22 is an example of the invention. All components are in wt. %.

TABLE 4

| Example | Type | BN | TiB2 | CaO | Y2O3 | Al2O3 | AlN |
|---|---|---|---|---|---|---|---|
| 20 | 2-part | 45 to 60 | 40 to 55 | 1–2 | | | |
| 21 | 3-part | 25–35 | 40–55 | 1–3 | | | 10–30 |
| 22 | 2-part | 53.6 | 45.0 | 0.1 | 0.7 | 0.6 | |

In a paper titled: "The Effects of Boat and Wire Parameters on Boat Life and Coating Quality in Vacuum Metallization of an OPP Web" by E. Josephson et al. (1995 SVC Conference Proceedings), the useful boat life of a two-part boat (BN/TiB2—the type of boat as in Example 20) was compared with the life of a three-part boat (BN/AlN/TiB2—the type of boat as in Example 21). The Author stated in the Results section: "Using two traditional measures of boat life, a two phase boat exhibited longer life. Boat composition was statistically significant with 90% confidence in the number of rolls and at 75% for linear feet metallized." Additionally, "Visual inspection of the boats showed less deposits and better corrosion resistance for two-phase boats."

The results of the corrosion and wettability tests indicate that Examples 21 and 22 show signification improved properties over the Classics boat of Example 20. However, Example 22 performs significantly better than with the boat of Example 21, showing improvements in both wettability and corrosion resistance properties. It is known in the art that there is a trade-off between wettability and corrosion resistance properties. Three-part boats are typically more wettable; however, two-parts boats are more corrosion resistance. Example 22 of the invention gives surprisingly improved and balanced properties with boats that are more wettable and as well as more corrosion resistant.

While the invention has been described with reference to a preferred embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims.

In this application all units are in the metric system and all amounts and percentages are by weight, unless otherwise expressly indicated. Also, all citations referred herein are expressly incorporated herein by reference.

We claim:

1. A refractory container for evaporating metals, said refractory container consisting essentially of:
    a) about 45 to 65 wt. % of boron nitride;
    b) about 35 to 65 wt. % of a refractory boride; and
    c) about 0.10 to 10 wt. % of a rare earth metal compound selected from
    YAG ($Al_5Y_3O_{12}$), YAP ($AlYO_3$), YAM ($Al_2Y_4O_7$), and combinations thereof.

* * * * *